United States Patent
Sherman et al.

[15] 3,651,256
[45] Mar. 21, 1972

[54] LASER DOCUMENT TRANSLATOR

[72] Inventors: Randy J. Sherman, Phoenix; Derald F. Hanson, Tempe, both of Ariz.

[73] Assignee: McCown Laboratories, Inc.

[22] Filed: Nov. 19, 1970

[21] Appl. No.: 91,117

[52] U.S. Cl. .................................. 178/7.6, 250/236, 350/7
[51] Int. Cl. .......................................................... H04n 3/08
[58] Field of Search .................... 178/7.6; 350/7, 99, 285; 250/230, 236

[56] References Cited

UNITED STATES PATENTS

| | | | |
|---|---|---|---|
| 3,370,176 | 2/1968 | Ett et al. | 350/7 UX |
| 3,495,036 | 2/1970 | Clayton | 178/7.6 |

*Primary Examiner*—Robert L. Griffin
*Assistant Examiner*—Richard K. Eckert, Jr.
*Attorney*—Drummond & Phillips, William H. Drummond and James H. Phillips

[57] ABSTRACT

A laser page scanner is disclosed in which the information bearing sheet to be scanned is disposed in a cylinder which translates axially past an opto-mechanical scanning apparatus fixed coaxially within the cylinder. A laser beam is directed from outside the cylinder along a path parallel to the cylinder axis into the interior of the cylinder where it is redirected by relay mirrors to the cylinder axis and to a rotating mirror which reflects the beam radially outwardly whereby the beam scans the cylinder in a continuous circle. As a result of the longitudinal translation of the cylinder, the document is, in effect, line scanned. The light reflected back to the rotating mirror at a given instant is an analog of information which is present at the scanned spot. The reflected light is redirected by the rotating mirror back along the axis of the cylinder through a pair of spot forming lenses to a first photo-diode which is utilized as the input sensor to suitable electronics for storing or reproducing the scanned information. A second photo-diode is fixed radially outwardly from the rotating mirror in order to intercept the laser beam once each revolution of the rotating mirror to provide a synch signal. A circular mask is disposed between the first photo-diode and the nearest spot forming lens to prevent a selected core portion of the beam from reaching the photo-diode to improve the signal-to-noise ratio. In order to simplify the optical system, one of the relay mirrors is cemented to the center of the spot forming lens nearest the first photo-diode to redirect the laser beam through the other spot forming lens before it impinges on the rotating mirror.

5 Claims, 3 Drawing Figures

LASER DOCUMENT TRANSLATOR

This invention relates to the document scanning arts and, more particularly, to apparatus for scanning a document with a collimated light beam and deriving an electrical signal according to the intensity of the reflected light.

The prior art document readers have included microdensitometers which provide high resolution but are very slow and optical character readers which are considerably fastener but offer poor resolution. The utilization of a rotating laser beam to scan a document constrained in a cylindrical configuration has been proposed to achieve both high speed and high resolution; however, the known prior art devices utilizing such an arrangement have been characterized by complicated and expensive optical systems and a marked inability to cope with specular first surface reflection resulting in a poor signal-to-noise figure in the electrical analog signal developed.

It is a broad object of this invention to provide an improved document translator.

It is another object of this invention to provide a document translator capable of operating at a high scan rate while achieving high resolution.

It is yet another object of this invention to provide such a document translator utilizing a source of collimated light, such a laser, as the scanning medium.

It is a still further object of this invention to provide such apparatus in which the optical and mechanical components are simple, reliable and economical to manufacture.

A still further object of this invention is to provide a document translator combining high speed and high resolution with a good signal-to-noise ratio in the electrical analog signal developed.

The subject matter of the invention is particularly pointed out and distinctly claimed in the concluding portion of the specification. The invention, however, both as to organization and method of operation, may best be understood by reference to the following description taken in connection with the accompanying drawing of which:

Figure 1:
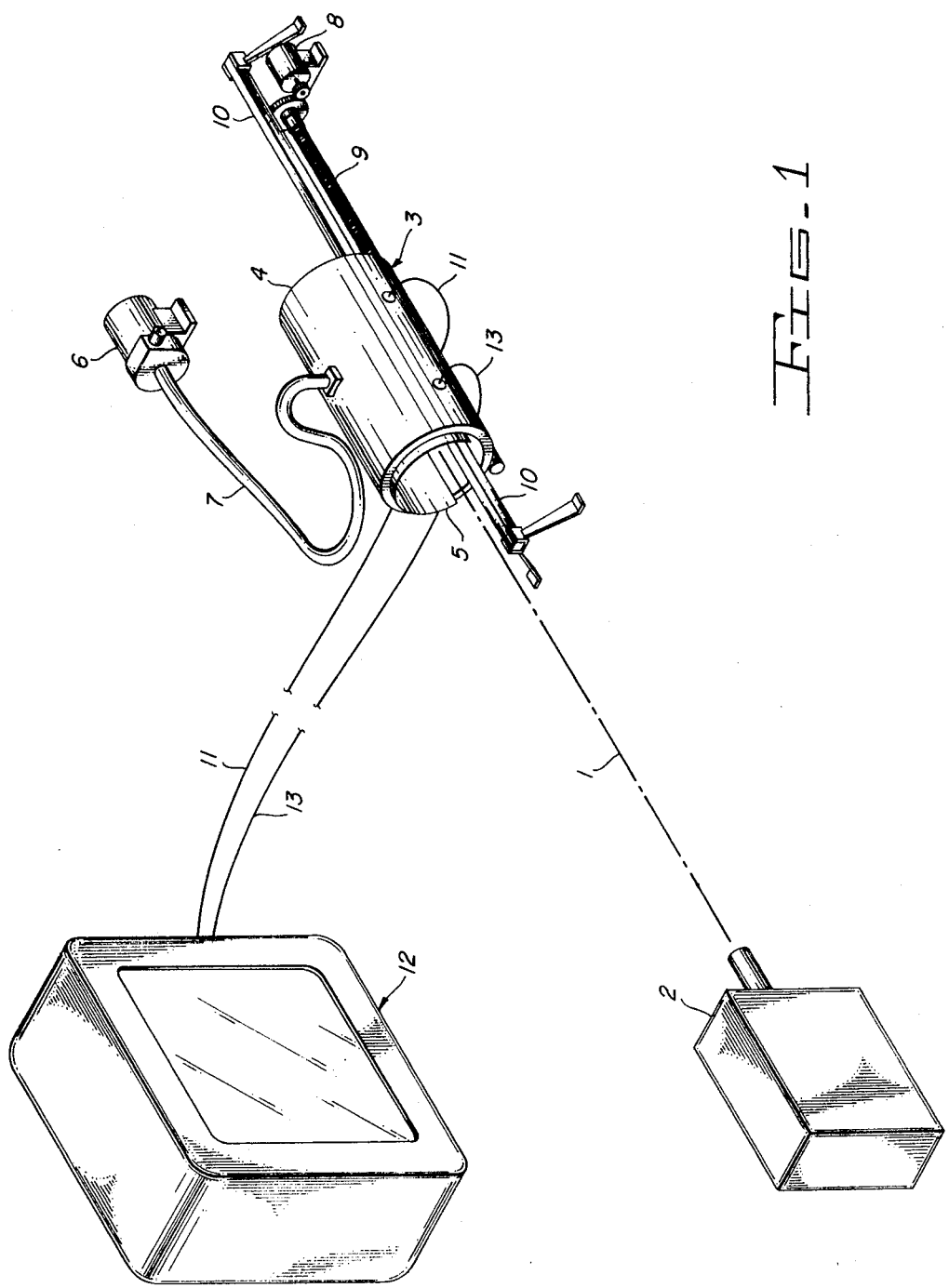
FIG. 1 is a simplified perspective view of a document reading and writing system illustrating the document translator of the present invention incorporated into an exemplary environment.

Referring now to FIG. 1, it will be observed that a collimated light beam 1, from a suitable source as the laser 2 is directed into a cylindrical document holding portion 4 of the translator 3. As will become more readily apparent as the description of the translator 3 proceeds, a document to be scanned, such as the document 5 which is shown partially inserted in FIG. 1, is slipped within the interior of the cylinder 4 where it is firmly held against the interior surface thereof through the action of a vacuum pump 6 which is coupled to the outer casing of the cylinder by the tubing 7.

During a scanning operation, the cylinder 4 of the translator 3 moves axially as a result of the activation of a motor 8 which drives a lead screw 9 to pull the cylindrical portion 4 rearwardly at a uniform speed. During the scanning operation, the optical system (not shown in FIG. 1) within the cylinder 4 remains stationery and is supported rigidly in position by a rail 10. The tubing 7 is flexible such that it can readily follow the passage of the cylinder 4.

The optical system within the translator redirects the beam 1 into a circular sweep radially outwardly directed from the axis of the cylinder 4. A synch pulse is derived each revolution as the beam sweeps about the interior of the cylinder and the synch signal is coupled by means of a wire 11 to apparatus for utilizing the information carried by the scanned document which may, by way of example only, be a video display 12. The information borne by the scanned document is converted to an electrical analog signal coupled by means of a wire 13 to the video display 12. Those skilled in the art will readily understand that many utilization devices can meaningfully accept the combination of a synch pulse and an information bearing signal to reproduce a scanned document, store the information in digital or analog form, transmit the information either by wire or wirelessly, etc.

Figure 2:
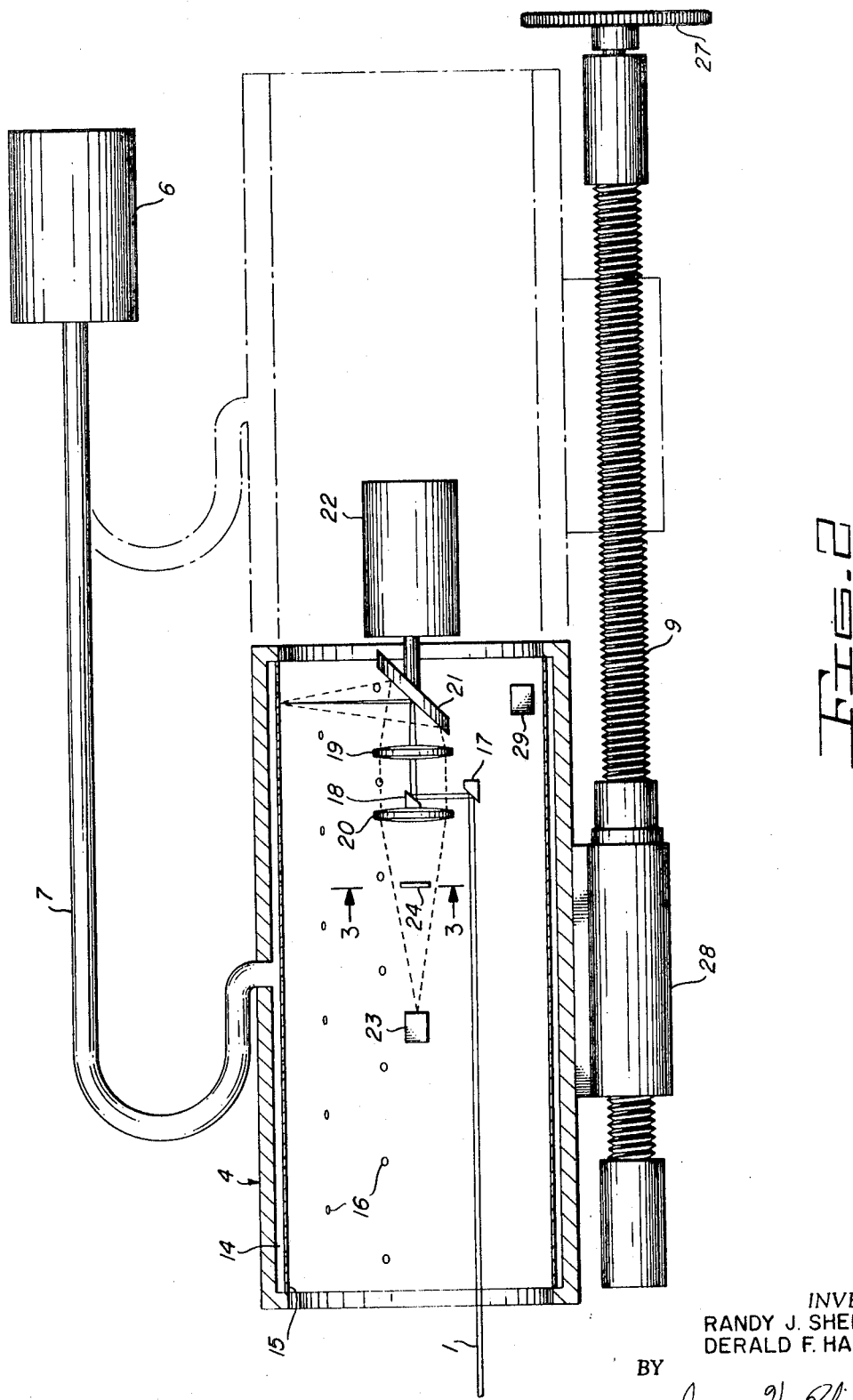
FIG. 2 is a cross-sectional view of the document translator of the present invention illustrating the essential optical and mechanical components and their manner of cooperation as a document is scanned.

Attention is now directed to FIG. 2 which reflects the functional elements of the document translator 3 in detail. The rail 10, FIG. 1, which supports certain of the optical and mechanical components, is not shown in FIG. 2 to avoid unnecessarily complicating the drawing. The cylinder 4 has a circumferential chamber 14 bounded on the inner side by a perforated cylinder liner 15 through which a number of apertures 16 pass for communication with the chamber. It will be apparent that, when the vacuum pump 6 is activated after a document has been inserted within the cylinder, the document will be pressed against the cylinder liner 15 as a result of the pressure differential between the interior of the cylinder and the chamber 14.

The collimated beam of light 1 is directed into the interior of the cylinder 4 along a path parallel to the cylinder axis until it impinges upon a first 45° relay mirror 17 which redirects the beam 1 perpendicularly in a path which intercepts the cylinder axis. A second 45° relay mirror 18 redirects the collimated beam 1 through a first spot forming or beam converging lens 19. The second 45° relay mirror 18 is cemented directly to the center of a second spot forming lens 20 which is supported coaxially with the cylinder 4. The first spot forming beam 19, like the second spot forming beam 20, is coaxial with the cylinder 4.

After passing through the first spot forming lens 19, the beam, now converging, impinges upon a rotating 45° mirror 21 which is turned by a motor 22 at a predetermined angular velocity. The axis of rotation of the 45° mirror 21 is also coaxial with the cylinder 4. The converging beam is redirected radially outwardly by the rotating 45° mirror 21 to strike the inner wall of the lining 15, or a document supported thereon, as a spot. Hence, the rotation of the mirror 21 provides a circular sweep about the interior of the cylinder 4.

Two components of light are reflected from the document and intercepted by the rotating mirror 21; viz.: a specular first surface reflection component which contains no information and a signal component the intensity of which carries meaningful information. Specifically, the intensity of the signal component conveys information specifying white, black or a shade of gray of the point on which the scanning beam is instantaneously focused. Both components of the reflected light are intercepted by the rotating mirror 21 and reflected through the first beam converging lens 19 which collimates the reflected light and through the second beam converging lens 20 which converges the beam of reflected light to focus on the sensitive surface of a light sensitive component of an electrical circuit such as the photo-diode 23. A photo-diode is preferred because of its response speed to variations in intensity of the sensed light. A similar photo-diode 29 intercepts the scanning beam from the rotating mirror 21 once each revolution to drive a synch pulse in the obvious manner.

Figure 3:
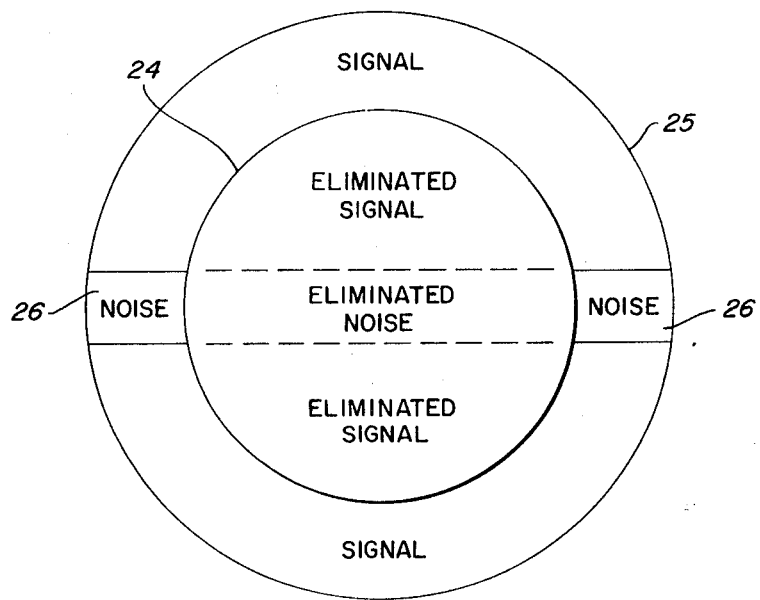
FIG. 3 is a view taken along the line 3—3 of FIG. 2 illustrating the relationship between a mask component of the translator and an information bearing, reflected beam.

A masking disc 24 is suspended by fine wires (not shown in FIG. 2) intermediate between the second beam converging lens 20 and the photo-diode 23 and concentrically with respect to the cylinder 4. It will be observed from FIG. 2 that the diameter of the masking disc 24 is less than the converging beam 25 of reflected light such that the "core" portion of the beam is prevented from impinging upon the photo-diode 23. The incorporation of the masking disc into the optical system improves the signal-to-noise ratio of the electrical signal developed as a result of the reflected light striking the photo-diode 23 by mitigating the effects of the specular first surface reflection component of the reflected light which is almost completely noise. The manner in which this is achieved may be more readily understood with reference to FIG. 3 in which it will be observed that specular first surface reflection appears within the converging beam 25 of reflected light as a rotating bar 26. This characteristic is a result of the geometry of the surface of the document in the area immediately adjacent the scanned spot; i.e., an interior cylindrical section. By interposing the masking disc 24 concentrically within the beam 25, it will be apparent from a study of FIG. 3 that the annular portion of the light beam 25 which is permitted to pass and strike the photo-diode 23, contains a significantly higher ratio of signal-to-noise insofar as specular first surface reflection noise is concerned, and this source of noise is by far the dominant offender observed in the subject system.

The mechanical arrangement whereby the cylinder 4 is drawn across the opto-mechanical scanning system was described briefly in connection with FIG. 1. Referring back to FIG. 2, the translating apparatus is perhaps more clearly shown in that it is apparent that the gear 27, driven in a step-down ratio by the motor 8 (FIG. 1), rotates the lead screw 9 which passes through an internally threaded member 28 fixed to the cylinder 4. When a document has been completely scanned as a result of the translation of the cylinder from its leftmost position to its rightmost position, shown in phantom in FIG. 2, the motor 8 may be reversed to return the cylinder 4 to its starting position. The return pass may be carried out at a higher rate than the scanning pass, if desirable, by using a reversible, multiple speed motor or the obvious alternative of two motors appropriately coupled to the lead screw 9.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

We claim:

1. Apparatus for scanning an information bearing document and developing an electrical signal which is an analog of the information comprising:
   a. a tubular document holding cylinder, said cylinder including means for supporting a document concentrically with respect to and in light receiving relationship to the axis of said cylinder;
   b. a light source for directing a collimated beam of light in a path parallel to said axis into the interior of said cylinder;
   c. a first relay mirror for receiving said collimated beam and redirecting it in the path which intercepts said axis;
   d. a second relay mirror for receiving said collimated beam from said mirror and redirecting it in a path coinciding with said axis;
   e. a 45° scan mirror rotatable about said axis and oriented to deflect said beam radially outwardly from said axis toward said document;
   f. means for rotating said mirror about said axis;
   g. a first beam converging lens disposed concentrically with respect to said cylinder and between said second relay mirror and said scan mirror, said first beam converging lens having a focal length equal to the sum of the distances between said first beam converging lens and said rotating mirror and between said rotating mirror and said document in order to focus said collimated beam on said document, said first beam converging lens also receiving and collimating light reflected from said document onto said rotating mirror;
   h. a first light sensitive sensor responsive to variations in the intensity of light for deriving an electrical signal analogous to the instantaneous light intensity; and
   i. a second beam converging lens disposed concentrically with respect to said cylinder and between said first beam converging lens and said first light sensitive sensor, said second beam converging lens having a focal length equal to the distance between said second beam converging lens and said first light sensitive sensor.

2. The apparatus of claim 1 which further includes means for providing mutual axial translation between said tubular document holding cylinder and said rotating mirror.

3. The apparatus of claim 2 which further includes a second light sensitive sensor fixed in position with respect to said rotating mirror in order to intercept said beam of light once each revolution of said rotating mirror to provide a synch pulse.

4. The apparatus of claim 1 in which said second relay mirror is fixed directly to said second beam converging lens.

5. The apparatus of claim 3 which further includes a masking disc suspended between said second beam converging lens and said first light sensitive sensor and disposed concentrically with respect to said cylinder, said masking disc having a diameter less than the diameter of the converging beam at is position between said second beam converging lens and said first light sensitive sensor such that only the portion of the converging beam directed toward said first light sensitive sensor beyond the periphery of said masking disc impinges upon said first light sensitive sensor.

* * * * *